(12) United States Patent
Takenaka et al.

(10) Patent No.: US 7,480,800 B1
(45) Date of Patent: Jan. 20, 2009

(54) SYSTEM AND METHOD FOR PROVIDING SERVICES EMPLOYING TRUSTED SITE INDICATORS, AND MOBILE DEVICE CAPABLE OF DISPLAYING THE TRUSTED SITE INDICATORS

(75) Inventors: Naozumi Takenaka, Tokyo (JP); Atsushi Suzuki, Tokyo (JP)

(73) Assignee: Digitiminimi, Inc. (JP)

( * ) Notice: Subject to any disclaimer, the term of this patent is extended or adjusted under 35 U.S.C. 154(b) by 0 days.

(21) Appl. No.: 09/575,290

(22) Filed: May 19, 2000

(30) Foreign Application Priority Data

May 21, 1999 (JP) .............................. P11-141433

(51) Int. Cl.
 *H04L 9/00* (2006.01)
 *G06F 15/16* (2006.01)
 *G06F 3/00* (2006.01)
 *G06F 3/14* (2006.01)

(52) U.S. Cl. ..................... 713/168; 713/170; 713/172; 713/176; 709/217; 715/761; 715/864; 705/67

(58) Field of Classification Search ................. 709/225, 709/203, 206, 217; 713/51, 168–181; 715/5, 715/517, 733, 760, 764, 761, 864, 513; 455/411, 455/158.4, 158.5; 705/50, 78, 75, 14, 26, 705/27, 41, 44, 67

See application file for complete search history.

(56) References Cited

U.S. PATENT DOCUMENTS

| | | | | |
|---|---|---|---|---|
| 5,754,654 A | * | 5/1998 | Hiroya et al. .................. | 705/76 |
| 5,903,878 A | * | 5/1999 | Talati et al. .................... | 705/26 |
| 6,018,724 A | * | 1/2000 | Arent ........................... | 705/44 |
| 6,065,120 A | * | 5/2000 | Laursen et al. ................. | 726/5 |
| 6,223,166 B1 | * | 4/2001 | Kay ............................. | 705/26 |
| 6,233,577 B1 | * | 5/2001 | Ramasubramani et al. .. | 709/203 |

(Continued)

FOREIGN PATENT DOCUMENTS

WO   WO 98/47116   * 10/1998

(Continued)

OTHER PUBLICATIONS

MLB.com, MLB.com sets new online ticketing mark for seventh straight year, Aug. 28, 2007, MLS advanced medis, L.P., p. 1.*

(Continued)

*Primary Examiner*—Ario Etienne
*Assistant Examiner*—Gregory G. Todd
(74) *Attorney, Agent, or Firm*—Kilpatrick Stockton LLP (57) ABSTRACT

A service providing system for verifying a source of information is disclosed. The system is composed of a computer network, at least one server connected to the computer network and sending information including a specified mark to the computer network, a communication carrier connected to the computer network and adding, when information received from the computer network includes the specified mark (Trusted Site Indicator tag), specified data (Trusted Site Indicator data) used to identify the server which has sent the information to the information, an mobile device provided with a proprietary display area which can not be edited or tampered by an unauthorized person, making wireless communication with the communication carrier and displaying the TSI (Trusted Site Indicator) data on the proprietary display area when receiving information includes the TSI (Trusted Site Indicator) data.

10 Claims, 6 Drawing Sheets

U.S. PATENT DOCUMENTS

| | | | |
|---|---|---|---|
| 6,249,584 B1 * | 6/2001 | Hamalainen et al. | 380/270 |
| 6,356,753 B1 * | 3/2002 | Kolev et al. | 455/411 |
| 6,408,330 B1 * | 6/2002 | DeLaHuerga | 709/217 |
| 6,442,532 B1 * | 8/2002 | Kawan | 705/35 |
| 6,463,534 B1 * | 10/2002 | Geiger et al. | 713/168 |
| 6,610,105 B1 * | 8/2003 | Martin et al. | 715/513 |
| 6,631,405 B1 * | 10/2003 | Kobata | 709/219 |
| 6,901,251 B1 * | 5/2005 | Kiessling et al. | 455/410 |
| 6,934,533 B2 * | 8/2005 | Joyce et al. | 455/414.1 |
| 6,993,785 B1 * | 1/2006 | Na | 725/80 |
| 7,047,205 B2 * | 5/2006 | Hale et al. | 705/5 |
| 7,415,715 B2 * | 8/2008 | Fradkov et al. | 719/328 |
| 2002/0059363 A1 * | 5/2002 | Katz et al. | 709/203 |
| 2002/0116271 A1 * | 8/2002 | Mankoff | 705/14 |

FOREIGN PATENT DOCUMENTS

| | | | |
|---|---|---|---|
| WO | WO 9904532 A2 * | 1/1999 | |
| WO | WO 99/16029 | 4/1999 | |
| WO | WO 99/23619 | 5/1999 | |
| WO | WO 00/57368 | * 10/2000 | |

OTHER PUBLICATIONS

Du Pre Gauntt, J., "Electronic Commerce on the Move", Proceedings of the Usenix Workshop of Electronic Commerce, Boston, Massachusetts, pp. 1-12, (Aug. 31, 1998).

* cited by examiner

SYSTEM AND METHOD FOR PROVIDING SERVICES EMPLOYING TRUSTED SITE INDICATORS, AND MOBILE DEVICE CAPABLE OF DISPLAYING THE TRUSTED SITE INDICATORS

CROSS REFERENCE TO THE RELATED APPLICATION

The subject application is related to subject matter disclosed in the Japanese Patent Application No. Heil1-141433 filed in May 21, 1999 in Japan, to which the subject application claims priority under the Paris Convention and which is incorporated by reference herein.

BACKGROUND OF THE INVENTION

1. Field of the Invention

The present invention relates generally to a service providing system for providing information via a computer network which is open to the public such as the Internet.

More specifically, the present invention relates to systems and methods for verifying authenticity of information as provided via the computer network and enabling a user to show the authenticity to a third party, and a mobile device used in the service providing system.

2. Description of the Related Art

In the recent years, it has been proposed to design mobile phones with which users can access to an information provider's site on a computer network via a public telephone line, an Internet provider and so forth, and finish booking online to reserve tickets for entering into the place where is held an exhibition, a concert and so forth.

The mobile phone is provided with a functional unit for connecting the computer network and can be enter a specified booking mode in order to perform the booking operation. More specifically speaking, when entering the booking mode, the mobile phone tries an access to the information provider's site on the computer network via a base station, a data communication network, an Internet provider and so forth. When the mobile phone is connected to the information provider's site, information about programs of a variety of entertainment, exhibitions and the like is transferred from the information provider's site. The information is given through the display of the mobile phone. The user of the mobile phone can review the information and select a favorite one of the programs which he or she desires to book for a ticket. If the request of the user is acceptable, the information provider's site transfers the confirmation number and the instruction information about the payment and so forth necessary for completing the booking procedure. The user is to perform the pending transaction thereafter in order to complete booking the ticket.

However, in the case of the prior art ticket reservation system with a mobile phone as described above, the procedure for actually getting a ticket has to be conducted after ticket reservation in the same manner as the conventional procedure. Namely, the user having booked takes the procedure of remitting an amount of money as charged to a ticket distributor contracting with the service provider of the information provider's site through a financial institution in accordance with the confirmation number and the instruction information about the payment and so forth from the mobile phone. Then, the ticket is transported to the user from the ticket distributor after confirming receipt of money.

In other words, while the booking operation of a ticket can be conducted online by means of a mobile phone, the ticket is made yet of a paper slip and has to be transported through a ticket distributor so that the user has to bring the ticket to go to the place where is held an exhibition, a concert and so forth.

Accordingly, in the case of the prior art ticket reservation system, a large number of paper tickets have to be printed and distributed through the ticket distributor so that a substantial cost is inevitable.

Furthermore, since the user can not enter the place where is held an exhibition, a concert and so forth without the ticket, there is a troublesomeness that he or she has to worry about the loss of the ticket.

SUMMARY OF THE INVENTION

The present invention has been made in order to solve the shortcomings as described above. It is an object of the present invention to provide a service providing system in which information about a ticket itself is downloaded from an information provider's site to a mobile phone and stored in the mobile phone and therefore it is possible to dispense with paper tickets and to significantly cut costs.

It is another associated object of the present invention to provide a service providing system in which ticket information can be transferred to a mobile device without fear of forgery or alteration by an unauthorized person.

In this case, when the ticket information providing service is available, it would be important to verify the authenticity of the information provider's server which provides booking service for reserved tickets. This is because that, if it is not certain from which the ticket information is given, a ticket checker can not determine the genuineness of the ticket.

It is therefore a further associated object of the present invention to provide a service providing system in which the authenticity of the ticket information can be verified and shown to the ticket checker.

In what follows, a typical example of the various aspect of the present invention will be briefly explained. Namely, in accordance with the present invention, a service providing system comprises (a) a computer network (for example, the Internet), (b) at least one server (information provider's server) connected to the computer network and sending information including a specified mark to the computer network, (c) a communication carrier connected to the computer network and adding, when information received from the computer network includes the specified mark (Trusted Site Indicator tag), specified data (Trusted Site Indicator data) to the information, the TSI data identifying the server which has sent the information, (d) a mobile device provided with a proprietary display area which can not be edited by an unauthorized person, making wireless communication with the communication carrier and displaying the TSI data on the proprietary display area when receiving information including the TSI data.

A unique TSI data item is assigned to each of authorized information provider's servers. A communication carrier receives information including a TSI tag, and then acquires the TSI data of the information provider's server that has sent the information and adds the TSI data to the information. The communication carrier then transfers the information including the TSI data to the mobile device. The mobile device displays the TSI data on the proprietary display area which can not be edited or altered by an unauthorized person and shows the TSI data to the user of the mobile device. The TSI data as shown is used to identify the information provider's server that has sent the information but can not be edited or altered. Because of this, a source of the information is identified and, as a result, the information as displayed on the mobile device can be verified. Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DESCRIPTION OF THE PREFERRED EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

Figure 1:
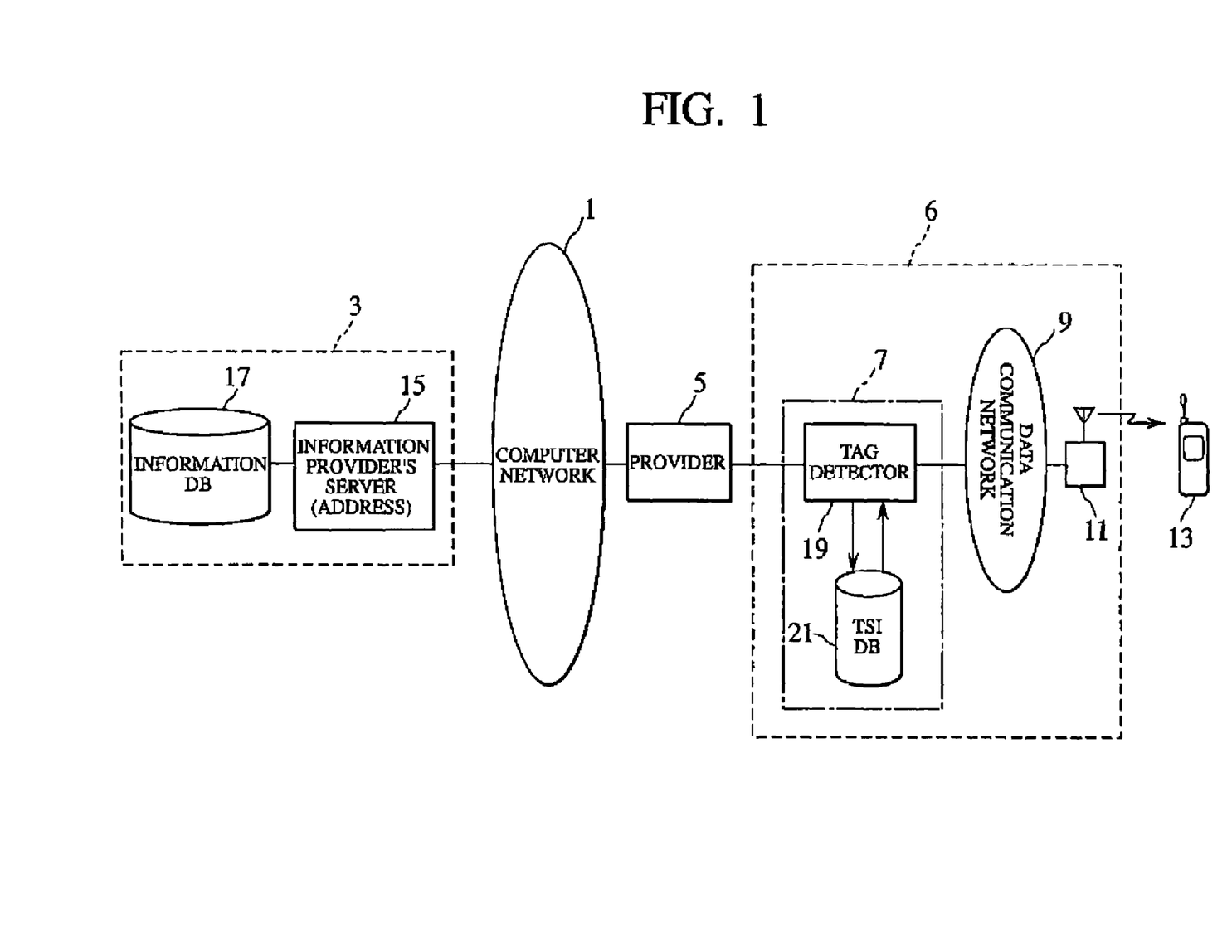
FIG. 1 is a block diagram showing an exemplary service providing system in accordance with a first embodiment of the present invention.

FIG. 1 is a block diagram showing an exemplary service providing system in accordance with a first embodiment of the present invention. As illustrated in FIG. 1, the service providing system in accordance with the first embodiment is composed of a computer network 1 which is open to the public such as the Internet, an information provider's site 3 of a service provider connected to the computer network 1, a communication carrier 6 connected to the computer network 1 through a provider 5, a mobile device 13 of a user of the service in wireless communication with the communication carrier 6. In FIG. 1, while the information provider's site 3 is illustrated as a lone site for the purpose of making clear the explanation, a number of similar information provider's sites 3 are connected to the computer network 1 in the actual case.

In this case, the computer network 1 is for example the Internet. The Internet is a global network that links smaller networks of computers by the use of the well defined TCP/IP protocol based upon packet communication. The computer network 1 can of course be implemented as another network. For example, the computer network 1 may be implemented as a satellite network or a wireless network.

The communication carrier 6 is composed of a service providing mode gateway 7 for making connection with the computer network 1 via provider 5, a data communication network 9 for making connection with the gateway 7 by packet communication, and a wireless base station 11 connected to the data communication network 9 for wireless communication with the mobile device 13. The provider 5 for making connection of the service providing mode gateway 7 with the computer network 1 is an entity that provides connections with the computer network 1 such as the Internet. The communication carrier 6 can make connection with the computer network 1 via the provider 5. The provider 5 is provided with routers which function as relay points on the network, gateways which connect computer networks that use different protocols, and so forth. Also, while the communication carrier 6 is indirectly connected to the computer network 1 through the provider 5 in FIG. 1, the present invention can be implemented even in the case that the communication carrier 6 and the computer network 1 are connected directly to each other.

Figure 2A:
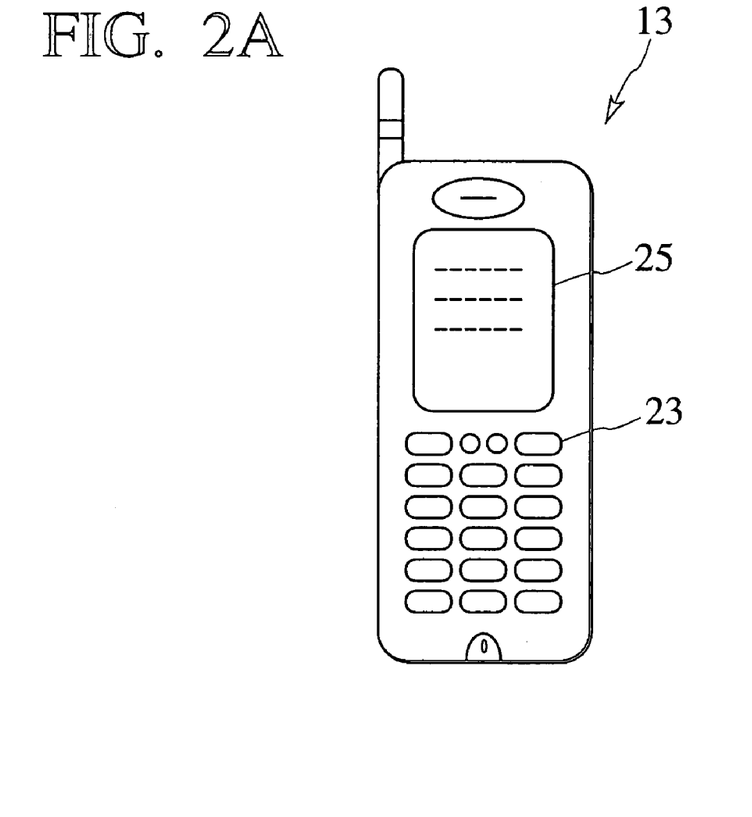
FIG. 2A is a schematic diagram showing the external view of the mobile device in accordance with the first embodiment of the present invention.
Figure 2B:
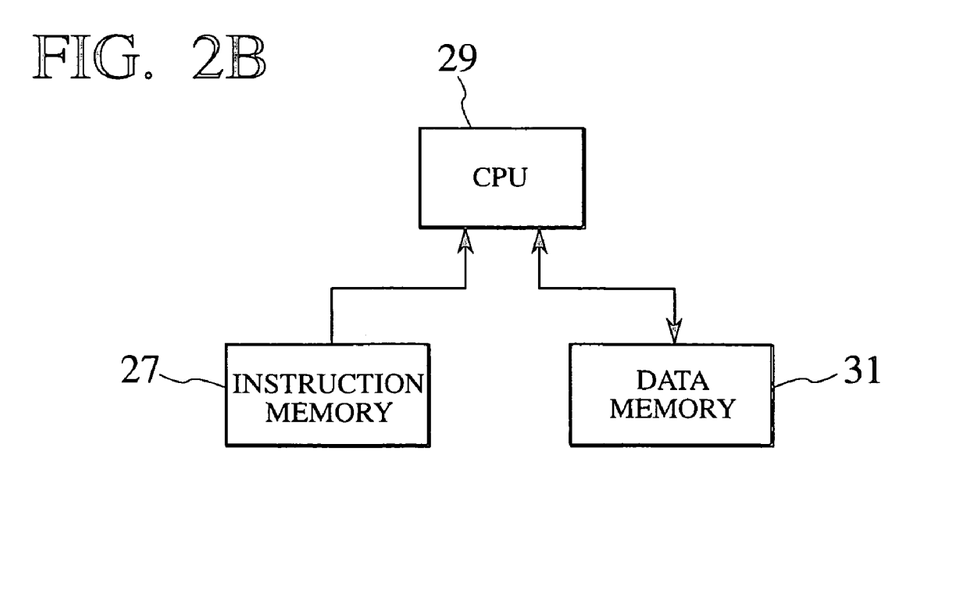
FIG. 2B is a block diagram showing the configuration of the mobile device in accordance with the first embodiment of the present invention.

The mobile device 13 may be a mobile phone, a PC, a PDA or another mobile wireless terminal, which has a function to make connection with the base station 11 of the communication carrier 6. Also, for example, the mobile device 13 is provided with a key pad 23 for inputting several instruction operations, and a display screen 25 for displaying a variety of information as illustrated in FIG. 2A. Furthermore, the mobile device 13 can be operated in a service providing mode for using services as provided by the information provider's site 3 and a telephone mode for the conventional telephone service. As illustrated in FIG. 2B, the mobile device 13 is composed further of an instruction memory 27 for storing a program for implementing the two modes within the mobile device 13, and a data memory 31 for temporarily storing a variety of information data. The program stored in the instruction memory 27 is transferred to a CPU 29 when required and executed by means of the CPU 29.

The information provider's site 3 is provided with an information provider's server 15 for exchanging information with the mobile device 13, an information database 17 for storing information about services to be provided for the mobile device 13. The information provider's server 15 is implemented as a general purpose computer provided with a high capacity storage device. The high capacity storage device is for example a hard drive(s) or a magneto-optical disc(s). Of course, the hard drive or the magneto-optical disc may be located within or outside of the information provider's server 15. The storage space of the high capacity storage device is partially assigned to the information database 17. In response to the request of the mobile device 13, the information provider's server 15 serves to transfer information of the information database 17 to the mobile device 13. A unique address on the computer network 1 is given to the information provider's server 15. The address is for example an IP address assigned to a computer (node) connected to the Internet. The information provider's server 15 can be identified by means of the address on the computer network 1.

The gateway 7 of the communication carrier 6 is composed of a tag detector 19 for detecting a trusted site indicator (TSI) tag in the information transferred from the information provider's server 15 to the mobile device 13, and a TSI database 21. The TSI tag is embedded in the ticket information as transferred from the information provider's site 3 and transferred to the mobile device 13 together with the ticket information. Then, the mobile device 13 serves to read the TSI tag in order to display TSI data as designated by the TSI tag on the display 25 of the mobile device 13. The tag detector 19 serves to detect whether or not there exists a TSI tag in the information as transferred from the information provider's server 15. When the TSI tag is detected, the tag detector 19 concatenates, with the TSI tag, the TSI data corresponding to the information provider's server 15 that has transferred that information. More specifically speaking, the TSI data is an unique data item of the information provider's server 15 as corresponding to the address of the information provider's server 15 on the computer network 1 and as distinct from the other information provider's servers as connected to the computer network 1. The TSI data consists of items which are assigned, in advance, to the information provider's server 15 and the similar information provider's servers connected to the computer network 1 in correspondence with the respective addresses of the information provider's server 15. On the other hand, the TSI database 21 serves to store the TSI data items of the information provider's servers in correspondence with the respective addresses of the information provider's servers. When the TSI tag is detected in the information as transferred, the tag detector 19 obtains the TSI data corresponding to the information provider's server 15 from the TSI database 21 with reference to the address of the information provider's server 15. Then, the tag detector 19 concatenates the TSI data as obtained with the TSI tag. The tag detector 19 can be implemented by an appropriate program in the form of a software or a firmware, or a hardwired control.

Next, the services available by means of the service providing system in accordance with the first embodiment of the present invention will be explained with reference to FIG. 3 through FIG. 5. There are three types of operations provided by the service providing system in accordance with the first embodiment, i.e., (A) the booking operation, (B) the ticket reception operation, and (C) the entrance operation.

(A) Booking Operation:

At the outset, the booking operation will be explained with reference to FIG. 3.

In the step S101, the user of the mobile device 13 switches the operation mode of the mobile device 13 by manipulations of the key pad 23 of the mobile device 13 from the telephone mode to the service providing mode. Next, in the step S103, the mobile device 13 accesses to the information provider's site 3 of the service provider via the base station 11, the data communication network 9 and the computer network 1, and makes connection with the information provider's server 15.

Next, in the step S105, the menu information of the services as provided by the information provider's site 3 is transferred to the mobile device 13 from the information provider's server 15. The menu information of the services as transferred is displayed on the display 25 of the mobile device 13. Meanwhile, the menu information of the services does not include the TSI tag. Accordingly, the tag detector 19 of the gateway 7 transfers the menu information to the data communication network 9 as it is without detecting the TSI tag in the menu information of the services.

Next, in the step S107, the user of the mobile device 13 browses the menu information of the services as displayed on the display 25 of the mobile device 13 and chooses a specified service (ticket reservation in this case for an exhibition, etc.). The request of the reservation is transferred to the information provider's site 3 via the base station 11, the data communication network 9, the gateway 7, the provider 5 and the computer network 1. The information provider's site 3 receives the request of the reservation and, if it is acceptable (i.e., if there is a seat available), transfers a reservation notice to the mobile device 13 together with a corresponding reservation number. The mobile device 13 then receives the reservation notice in the step S109.

Next, in the step S111, the user having received the reservation notice transfers the password and the card number of his or her credit card for example through the mobile device 13 in order to perform the pending transaction Of course, the pending transaction can be performed by the remittance through a financial institution, the registered mail for cash and so forth.

(B) Ticket Reception Operation:

Next, the ticket reception operation will be explained with reference to FIG. 4.

Figure 3:
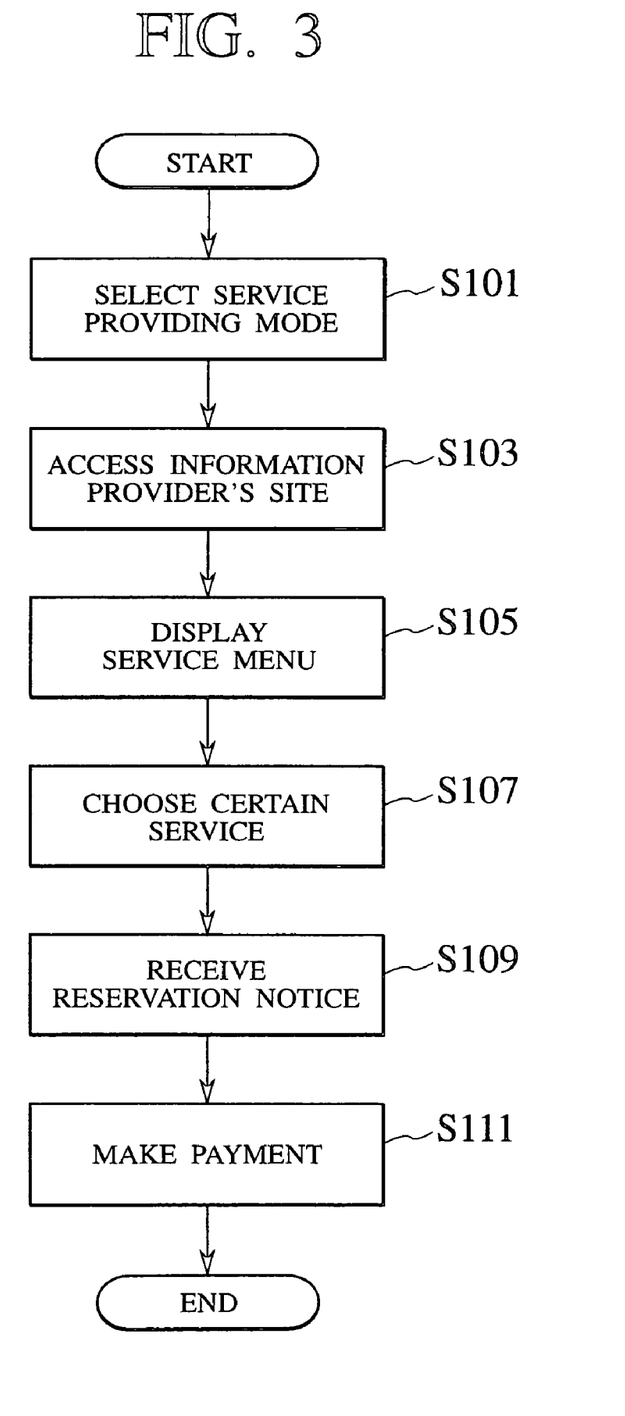
FIG. 3 is a flowchart showing the procedure for the service providing technique in accordance with the first embodiment of the present invention.

After completing the transaction (MAKE PAYMENT) in the step S111 as illustrated in FIG. 3 the information provider's server 15 of the information provider's site 3 sends the ticket information including the TSI tag to the mobile device 13 of the user in the step S201. The ticket information including the TSI tag is inputted to the service providing mode gateway 7 of the communication carrier 6 via the computer network 1 and the provider 5.

Next, after the ticket information is inputted to the gateway 7, the tag detector 19 tries to detect the TSI tag within the ticket information in the step S203. When the TSI tag is detected, the tag detector 19 obtains the address of the information provider's server 15 which transfers the ticket information and reads the TSI data corresponding to the address from the TSI database 21 in the step S205. Next, in the step S207, the tag detector 19 adds the TSI data as obtained to the TSI tag and then sends the ticket information to the data communication network 9. Optionally, the tag detector 19 may replace the TSI tag (the initial TSI tag), as originally embedded, with a new second TSI tag.

Next, in the step S209, the mobile device 13 receives the ticket information including the TSI tag concatenated with the TSI data via the data communication network 9 and the base station 11.

On the other hand, the display 25 of the mobile device 13 as illustrated in FIG. 2 is divided into a proprietary display area, which is exclusively used by the communication carrier 6 and can not be edited or altered by any other unauthorized person, and a remaining general-purpose display area. The communication carrier 6 generates a control signal for controlling the proprietary display area and transfers the control signal together with general information sent from the information provider's server 15 to the mobile device 13.

Usually, the TSI tag and the TSI data as explained above are separated from the ticket information in the communication carrier 6, inserted into the control signal as described above and transferred to the mobile device 13. On the other hand, the ticket information except for the TSI tag and the TSI data is transferred to the mobile device 13 as general information as described above. In this case, the TSI data is displayed on the proprietary display area of the display 25 of the mobile device 13 while the ticket information is displayed in the general-purpose area of the display 25. Any editing of the contents in the proprietary display area is practically impossible by any other unauthorized person and therefore the authenticity of the TSI data as displayed is guaranteed.

Of course, the TSI tag and the TSI data may optionally be transferred to the mobile device 13 as general information rather than that separated from the ticket information. In this case, the mobile device 13 is responsible for separating the TSI tag and the TSI data from the ticket information and displaying the TSI data on the proprietary display area of the display 25. Also, it is possible to enhance the security of the TSI data by transferring the TSI data after encrypting it. For example, while the TSI data is encrypted when the TSI tag is concatenated with the TSI data, the TSI data is displayed on the proprietary display area after decrypting it.

Figure 4:
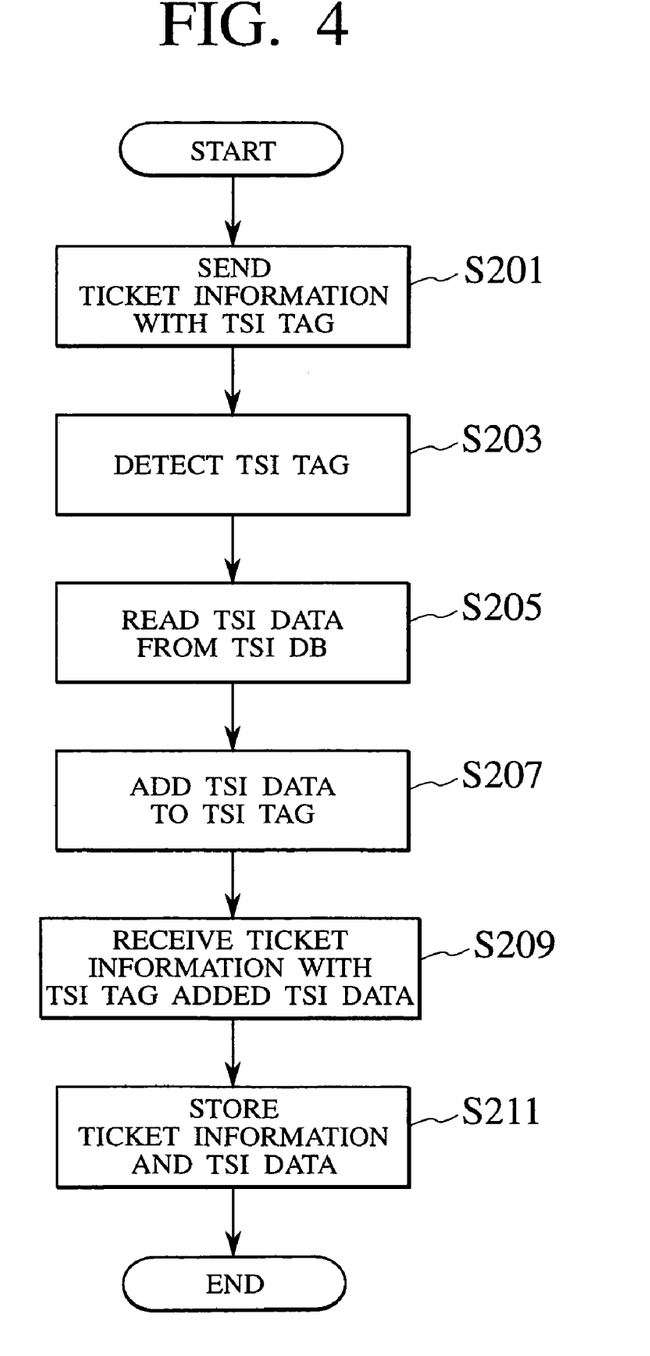
FIG. 4 is a flowchart showing the procedure for the service providing technique in accordance with the first embodiment of the present invention.
Figure 5:
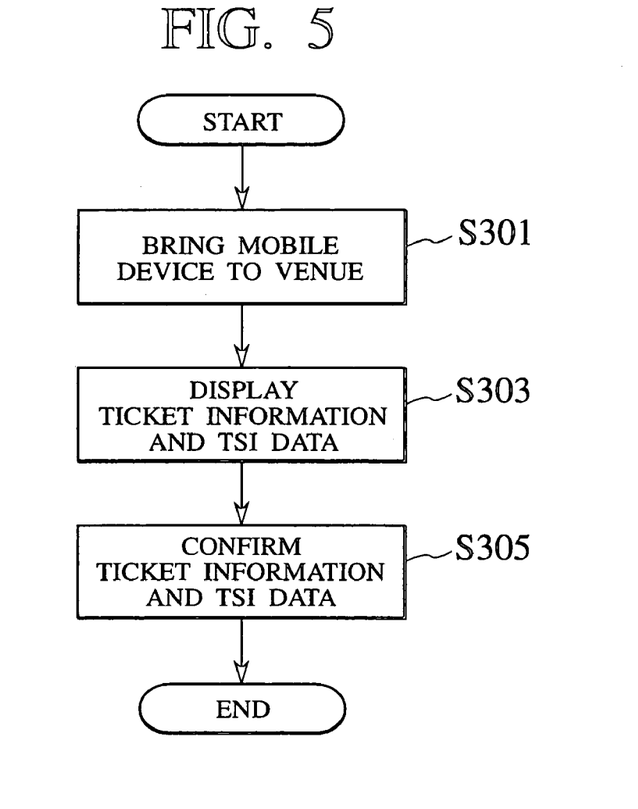
FIG. 5 is a flowchart showing the procedure for the service providing technique in accordance with the first embodiment of the present invention.

On the other hand, if there is not found in the TSI database 21 the TSI data corresponding to the address of the information provider's server 15 having transferred the ticket information in the step S205 as illustrated in FIG. 4, the tag detector 19 deletes the TSI tag from the ticket information. Namely, the tag detector 19 makes a judgment that the information provider's site 3 (the information provider's server 15) whose address has no corresponding the TSI data is an illegal site and deletes the TSI tag as embedded from the ticket information. In this case, of course, there is no displayed the TSI data on the display 25 of the mobile device 13 which has received the ticket information from which the TSI tag is deleted. Accordingly, the source of the ticket information displayed in the display 25 of the mobile device 13 can not be identified so that it is impossible to make sure the authenticity of the ticket information. Alternatively, it is possible to display an appropriate signal indicating "illegal site" on the display 25 of the mobile device 13 rather than simply not to display the TSI data. The signal indicating "illegal site" may be displayed in another area apart from the display 25.

Figure 6:
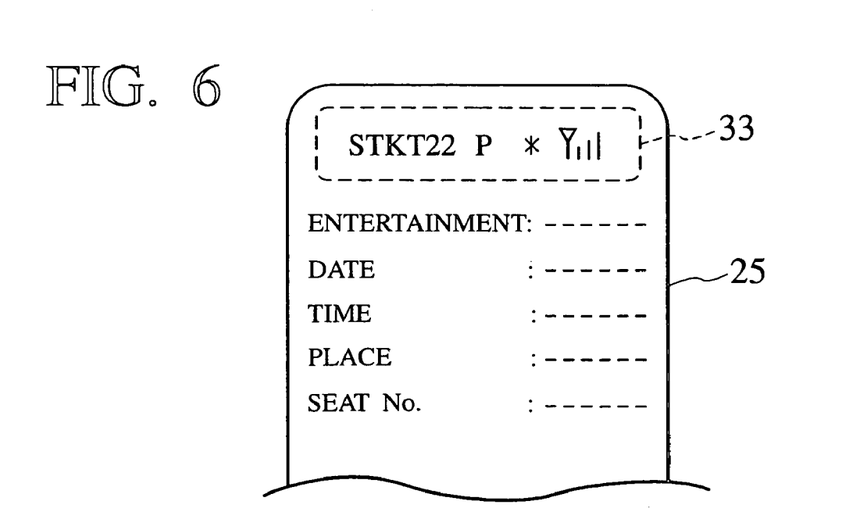
FIG. 6 is a schematic diagram showing exemplary contents as displayed in the display of the mobile device as illustrated in FIG. 2A.

Next, in the step S211, as shown in FIG. 6, the TSI data (STKT22) is displayed on the proprietary display area 33 of the display 25 of the mobile device 13 which receives the ticket information including the TSI data while the ticket information (e.g., concert information) is displayed in the general-purpose area of the display 25 except for the proprietary display area 33. The TSI data and the ticket information as paired can be displayed by a predetermined manipulation after stored in the data memory 31 of the mobile device 13 as illustrated in FIG. 2B. Also, while part of the display 25 is assigned to the proprietary display area 33 as illustrated in FIG. 6, the proprietary display area 33 can be designed as an independent screen area separate from the display screen for the general-purpose area.

(C) Entrance Operation:

Next, the entrance operation will be explained with reference to FIG. 5.

In the step S301, the user of the mobile device 13 brings the mobile device 13 to the concert hall on the day of the concert of the reservation. Next, in the step S303, the user of the mobile device 13 manipulates the mobile device 13 to read out the TSI data and the ticket information stored in the data memory 31 to display the same on the display 25. The user of the mobile device 13 then shows the TSI data and the ticket information as displayed on the display 25 to the ticket checker of the hall.

The ticket checker of the hall confirms the ticket information and the TSI data as displayed on the display 25 of the mobile device 13 and determines whether or not it is in agreement with the ticket information and the TSI data as obtained in advance. If it is in agreement, the user is allowed to enter.

Meanwhile, in the case of a conventional procedure, a ticket is snatched and divided into two pieces, when the user enters, for the purpose of counting the number of visitors and confirmation of the ticket having used. In the case of the present invention, the fact of "having been snatched" can be displayed on the display 25 of the mobile device 13 by a predetermined manipulation of the ticket checker of the hall. Optionally, in response to a manipulation of the ticket checker of the hail, the mobile device 13 initiates the access operation to the information provider's site 15 in order to confirm the visitor. Alternatively, the mobile device 13 initiates the wireless access operation to a terminal provided on reception desk in order to inform the mobile device 13 of the fact of "having been snatched".

Second Embodiment

Next, the second embodiment of the present invention will be explained. In the case of the first embodiment of the present invention as described above, the communication carrier 6 serves to detect the TSI tag in the ticket as transferred and concatenate the TSI tag with the TSI data. Furthermore, the communication carrier 6 is provided with the TSI database 21 in which a number of the TSI data items. Contrary to this, in the case of the second embodiment, the mobile device serves to detect the TSI tag in the ticket information as received and concatenate the TSI tag as detected with the TSI data. Furthermore, the TSI database for storing the TSI data need no longer be located in the communication carrier but can be located somewhere on the computer network. Namely, in the case of the second embodiment, the communication carrier serves to transfer information transferred from the information provider's site to the mobile device without modification, while the mobile device serves to detect the TSI tag in the ticket information as received and obtain the TSI data by itself.

Figure 7:
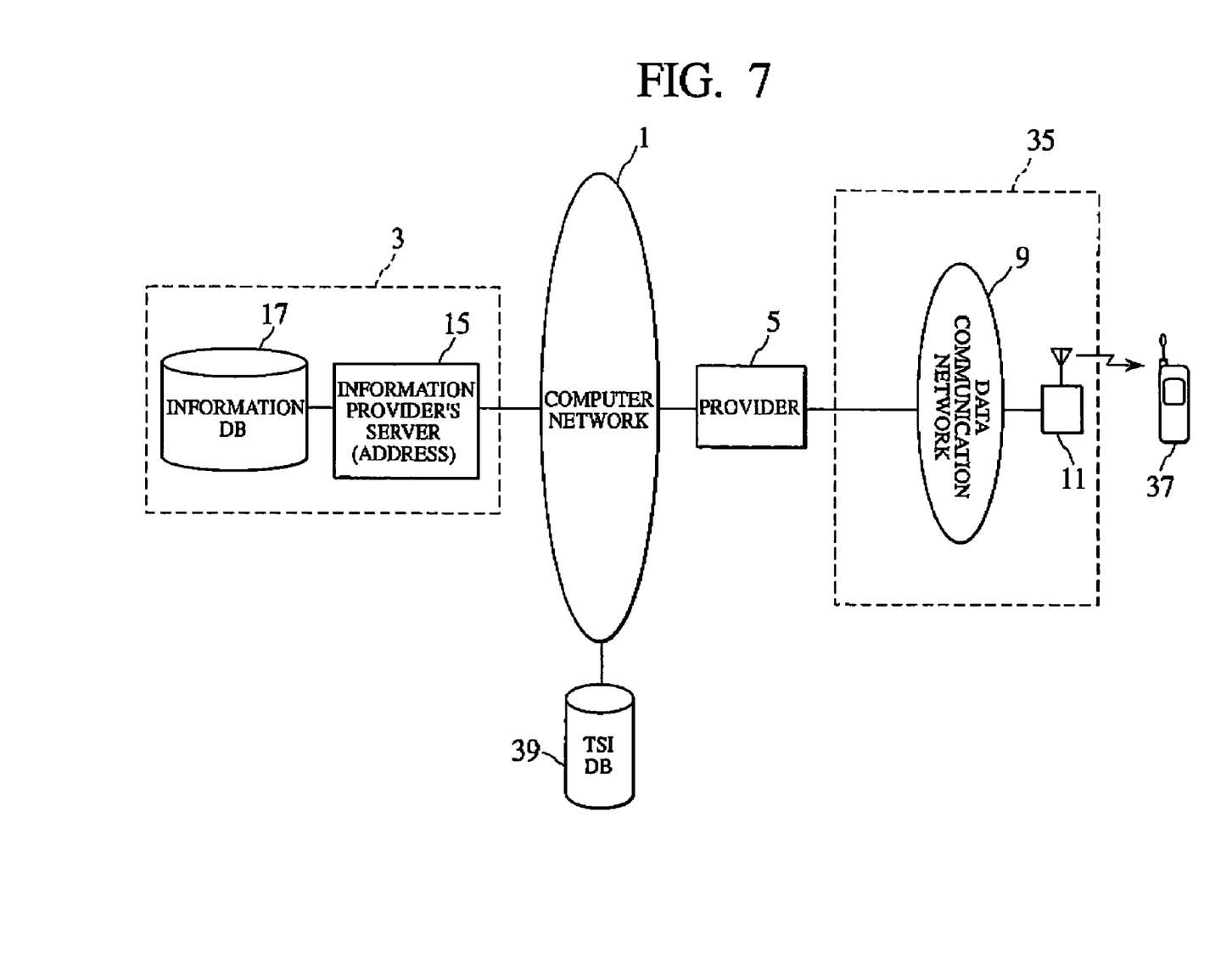
FIG. 7 is a block diagram showing an exemplary service providing system in accordance with a first embodiment of the present invention.

FIG. 7 is a block diagram showing an exemplary service providing system in accordance with a second embodiment of the present invention. As illustrated in FIG. 7, the service providing system of the second embodiment of the present invention is composed at least of an information provider's site 3 of a service provider connected to a computer network 1 which is open to the public such as the Internet, a communication carrier 35 connected to the computer network 1 through a provider 5, a mobile device 37 of a user of the service in wireless communication with the communication carrier 35, a TSI database 39 which is connected to the computer network 1. Also in FIG. 7, the information provider's site 3 is illustrated as a lone site for the purpose of making clear the explanation.

The mobile device 37 in accordance with the second embodiment of the present invention is provided with a tag detector for detecting whether or not there exists a TSI tag in information as transferred from the information provider's site 3. Namely, a tag detection program has been installed in the mobile device 37 in order to implement the similar function as the tag detector 19 in accordance with the first embodiment of the present invention. The tag detection program has been stored in the instruction memory 27 located in the mobile device 37 as illustrated in FIG. 2B.

When the mobile device 13 receives the ticket information as transferred from the information provider's site 3, the tag detection program is executed within the mobile device 13. It is then detected whether or not there exists a TSI tag within the ticket information as transferred by running the tag detection program. When the TSI tag is detected, the mobile device 13 accesses to the TSI database 39 connected to the computer network 1 and searches the TSI data corresponding to the address of the information provider's server 15 which transfers the ticket information. If the corresponding TSI data exists in the TSI database 39, the mobile device 13 acquires and displays the TSI data on the display. On the other hand, if no corresponding TSI data exists, the TSI tag is deleted.

While the present invention is applied to the case of booking online to reserve tickets for entering into the place where is held an exhibition, a concert and so forth, the application is not limited thereto. For example, the present invention is applicable also to provide a service for making it possible to receive an identification card (ID card) of a user at a place other than public offices. Namely, by booking on the site of a public office for receiving the ID card and obtaining TSI data in advance, the user can receive the ID card from a third party who can confirm the authenticity of the reservation and hand over the ID card to the user who shows a mobile device for displaying the TSI data.

On the other hand, for entities such as banks, stock companies who give highest priority to the creditability, it is particularly important to improve authenticity of security relating to the web sites thereof. The entities of this kind can enhance the authenticity of information as transferred from the web sites thereof by concatenating the TSI data to the information and maintain the credibility of the web sites.

Various modifications will become possible for those skilled in the art after receiving the teachings of the present disclosure without departing from the scope thereof.

The invention claimed is:

1. A service providing system comprising:
    a network having
        an information providing server which provides information, and
        an authentication server capable of sending and receiving information to and from the information providing server; and
    a portable terminal capable of sending and receiving information to and from the network;
    wherein the information providing server is configured to send to the authentication server information requested by the portable terminal, address information associated with the information providing server, and tag information;
    wherein the authentication server has an authentication information database which stores authentication information;
    wherein the authentication server has a detector which detects the tag information;
    wherein the authentication server has a transmitter which sends to the portable terminal the requested information sent by the information providing server and the authentication information retrieved from the authentication database when the tag information is detected and the address information matches information stored in the authentication database; and
    wherein the portable terminal has a first display area which displays the requested information sent by the information providing server and a second display area which displays only the authentication information which specifically identifies the information providing server, the second display area being an independent screen area separate from the first display area, and the authentication information can not be edited by the portable terminal.

2. The service providing system of claim 1, wherein the portable terminal further includes a radio transmitter to access the network via wireless communication.

3. The service providing system of claim 1, wherein the portable terminal further comprises one from the group consisting of a mobile phone, personal computer, and personal digital assistant.

4. The service providing system of claim 3, wherein:
    the requested information identifies an event; and
    the combination of the requested information and the authentication information serve as an electronic ticket to the event.

5. The service providing system of claim 1, wherein the authentication information further comprises alpha-numeric text to uniquely identify the information providing server.

6. The service providing system of claim 1, wherein the authentication information further comprises an IP address to uniquely identify a location of the information providing server on the network.

7. The service providing system of claim 1, wherein the requested information further comprises a date, time, and location to uniquely identify an event.

8. The service providing system of claim 1, wherein the authentication information is transmitted to two or more portable terminals to authenticate the requested information sent to each portable terminal.

9. A service providing method using a portable terminal which can be connected to a network having an information providing server and an authentication server, the method comprising:
    the portable terminal accessing the network to request information;
    the information providing server transmitting to the authentication server the information requested by the portable terminal, address information for the information providing server, and tag information;
    the authentication server detecting the received tag information;
    the authentication server retrieving authentication information when the tag information is detected and the received address information matches information stored in the authentication server, and sending the requested information sent by the information providing server and the authentication information to the portable terminal; and
    the portable terminal displaying the requested information on a first display area and only the authentication information which specifically identifies the information providing server on a second display area, the second display area being an independent screen area separate from the first display area, and the authentication information can not be edited by the portable terminal.

10. The service providing method of claim 9 wherein the portable terminal accesses the network via wireless communication.

* * * * *